Dec. 13, 1966     J. T. LUNENSCHLOSS ETAL     3,291,003
AUTOMATIC DOOR OPERATOR CONTROL SYSTEMS
Original Filed Nov. 14, 1963                  7 Sheets-Sheet 1

INVENTORS
JOHN T. LUNENSCHLOSS
AND DU WANE J. BUSSE
BY Joseph G. Werner

ATTORNEY

INVENTORS
JOHN T. LUNENSCHLOSS
AND DU WANE J. BUSSE
BY Joseph G. Werner

ATTORNEY

INVENTORS
JOHN T. LUNENSCHLOSS
AND DU WANE J. BUSSE
BY Joseph G. Werner

ATTORNEY

INVENTORS
JOHN T. LUNENSCHLOSS
AND DU WANE J. BUSSE
BY
Joseph G. Werner

ATTORNEY

United States Patent Office 3,291,003
Patented Dec. 13, 1966

3,291,003
AUTOMATIC DOOR OPERATOR CONTROL SYSTEMS
John T. Lunenschloss, 5430 Lake Mendota Drive, and Duwane J. Busse, 210 Glenway St., both of Madison, Wis.
Original application Nov. 14, 1963, Ser. No. 323,723, now Patent No. 3,244,415, dated Apr. 5, 1966. Divided and this application Nov. 19, 1965, Ser. No. 508,772
4 Claims. (Cl. 91—459)

This application is a division of our co-pending application S.N. 323,723, filed Nov. 14, 1963 now Patent No. 3,244,415, issued Apr. 5, 1966.

Our invention relates to improvements in automatic door operators, and more specifically to improvements in automatic door operator control systems.

It is a primary object of our invention to provide a novel control system for an automatic door operator which has a minimum number of moving parts, is economical to manufacture and which provides for efficient and reliable operation of the door operator.

It is a further object of our invention to provide such a control system which is easily adapted for use with several types of automatic door operators.

Other objects and advantages of our invention will be apparent from the following detailed description taken in conjunction with the accompanying drawings wherein a preferred embodiment of the principles of the invention has been selected for exemplification.

In the drawings:

FIG. 6b is a schematic diagram of the electrical circuit of the invention of FIG. 6a.

Our invention may be adapted for use with any automatic door operator having as its essential working elements a cylinder and a piston. It is specifically described and illustrated for use with improved versions of three successful, commercially proven door operators; the swing operator of the general type shown in FIGS. 1–3; the over-center operator of the general type shown in FIGS. 7–9; and the inertia operator of the general type shown in FIGS. 12–14. The original version of the swing operator was first disclosed in United States Patent 1,716,707, issued Jan. 11, 1929; the original version of the over-center operator in United States Patent 1,657,544, issued Jan. 31, 1928; and the original version of the inertia operator in United States Patent 2,380,334, issued July 10, 1945.

The swing operator 20, which is schematically illustrated in FIGS. 1 to 5, may be adapted to both open and close any hinged door. A frame 21, which may be fixedly connected by bolts 22 or other similar means to a door frame or wall 23, is used to mount the working elements of the swing operator 20. Those working elements include a cylinder 24, a piston rod 25, a piston 26 slidably mounted within the cylinder 24, a substantially L-shaped main lever 27 having a longer leg 28 and a shorter leg 29, a spring 30, and a link 31 which is adjustable in length.

Figure 1:
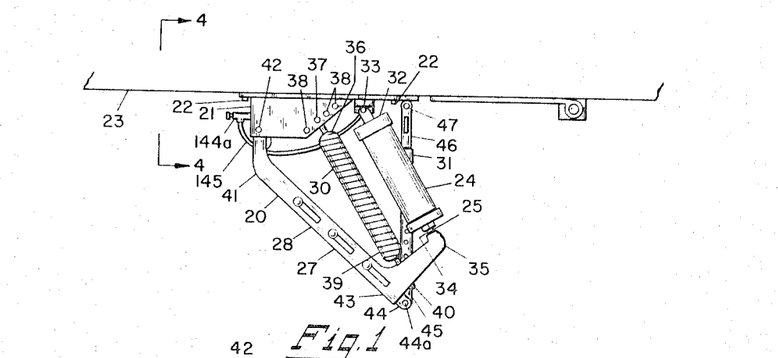
FIG. 1 is a top view of one embodiment of an automatic door operator in its position when the door is closed.

The inner end 32 of the cylinder 24 is pivotally secured to the frame 21 by a pin 33 or other similar means, and the outer end 34 of the piston rod is fixedly secured to the tip 35 of the shorter leg 29 of the main lever 27. The inner end 36 of the spring 30 is pivotally secured to the frame 21 by a pin 37 or other similar means inserted within one of the plurality of holes 38 in the frame 21. Its outer end 39 is adjustably secured to the shorter leg 29 of the main lever 27 with a screw 40 or other similar means that permits adjustment of the tension of the spring 30. The inner end 41 of the longer leg 28 of the main lever 27 is pivotally attached to the frame 21 by a shaft 42 or other similar means, while its outer end 43 carries a bar 44 pivotally connected to one end 45 of the link 31 by a pin 44a or other similar means. The other end 46 of the link 31 is pivotally connected to a hinged door 48 by a pin 47 or other similar means. Preferably, the link 31 is made adjustable in length by any suitable means, and the position of the bar 44 on the longer leg 28 of main lever 27 can be adjusted as desired.

Figure 2:
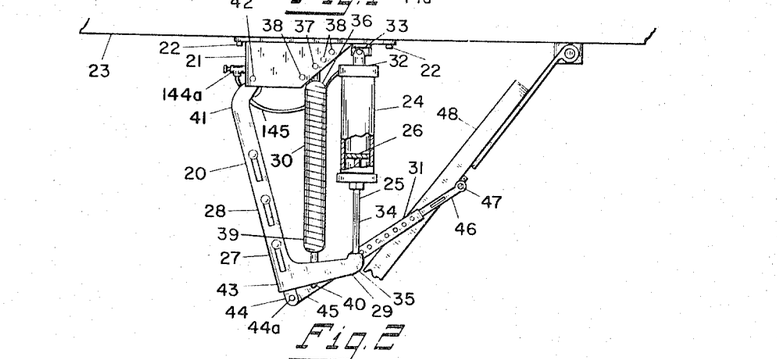
FIG. 2 is a top view, partially in horizontal section, of the door operator of FIG. 1 when the door is approximately at the half-way point in its travel.
Figure 3:
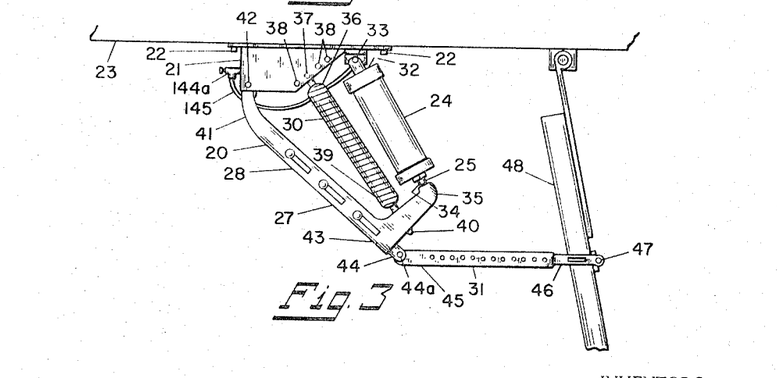
FIG. 3 is a top view of the door operator of FIG. 1 when the door is open.

The operation of the swing operator 20 in opening the door 48 is illustrated in FIGS. 1 to 3. In FIG. 1 the door 48 is closed and at rest. A fluid under pressure, preferably air, enters the cylinder 24 at its inner end 32 and begins to push the piston 26 and the piston rod 25 outwardly. The main lever 27 thereby pivots outwardly about the shaft 42, while simultaneously the link 31, pivoting at both the pins 44a and 47, pulls the door 48 outward from the door frame. At approximately the half-way point in the travel of the door 48, the pressurized fluid is exhausted from the cylinder 24 to eliminate the force on the piston 26 and the piston rod 25. FIG. 2 illustrates the position of the swing operator 20 at the half-way point of its operation. The momentum of the door 48 and the tension given the spring 30 by the movement of the swing operator 20 to the position of FIG. 2 then complete the opening of the door to the position shown in FIG. 3 wherein the door 48 is open and at rest. A comparison of FIGS. 1 and 3 show that, except for the position of the link 31, all the elements of the swing operator 20 are in the same position when the door 48 is open as when the door is closed. The operation of the swing operator 20 in closing the door 48 is identical to that in opening it, except that the link 31 moves in the opposite direction.

Figure 8:
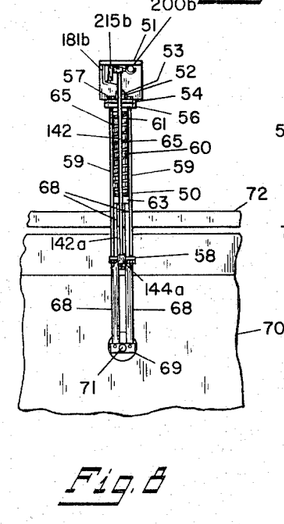
FIG. 8 is a front view of the door operator of FIG. 7 when the door is approximately at the half-way point in its travel.
Figure 9:
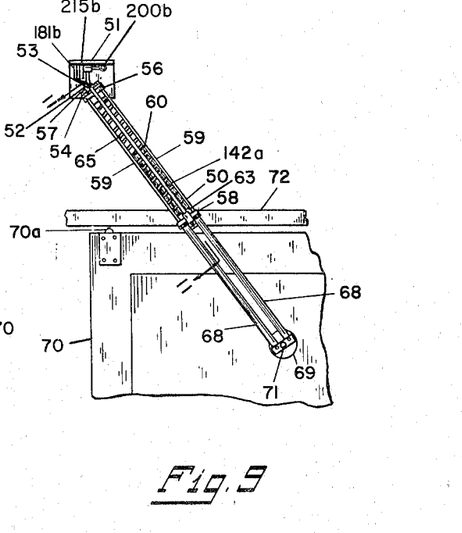
FIG. 9 is a front view of the door operator of FIG. 7 when the door is open.
Figure 10:
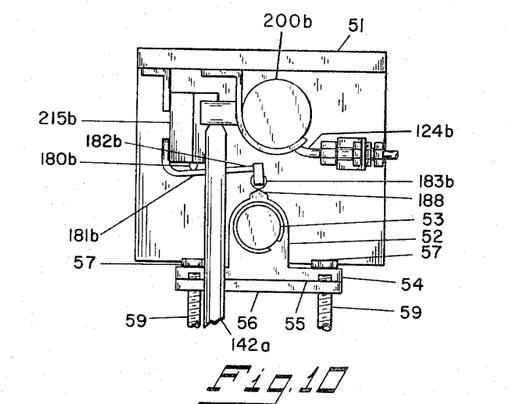
FIG. 10 is a detailed front view of the frame which mounts the door operator of FIGS. 7 to 9.

The over-center operator 50, shown in FIGS. 7 to 11, is adapted to both open and close a sliding door. A frame 51, which may be attached to a wall or ceiling by any suitable means, supports the elements of the over-center operator 50. A bearing 52 is rotatably mounted on a substantially horizontal shaft 53 projecting from the frame 51. As best shown in FIG. 10, the bearing 52 has a flange 54 with a substantially flat, downwardly facing surface 55. A top plate 56 is attached by bolts 57 or other similar means to the surface 55 of the flange 54.

Figure 11:
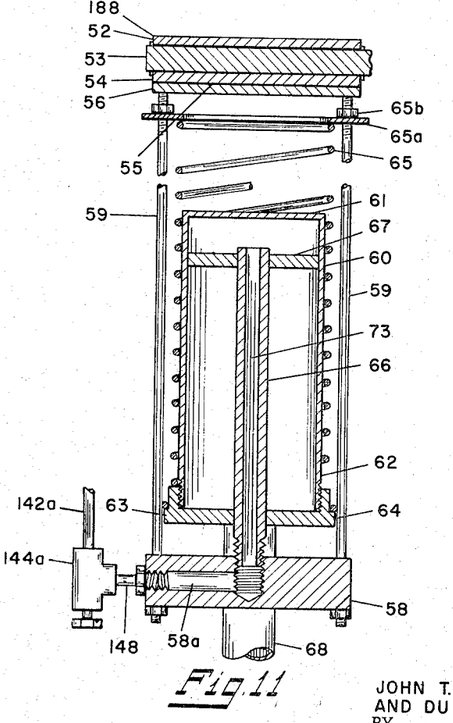
FIG. 11 is a partial section view taken along line 11—11 in FIG. 9.

Extending in fixed relation between the top plate 56 and a bottom manifold 58 are a plurality of circumferentially spaced rods 59. A cylinder 60 having a closed upper end 61 and an externally threaded lower end 62 is enclosed within the rods 59 in spaced relation thereto as best shown in FIG. 11. The lower end 62 of the cylinder 60 is threadedly engaged with a cap 63 having a flange 64 which is spaced from the rods 59. The cylinder 60 and the cap 63 are thus slidable between the rods 59. An adjusting ring 65a is carried by the rods 59, and a spring 65 extends between the flange 64 of the cap 63 and the adjusting ring 65a, and is enclosed by the rods 59. The tension in spring 65 may be changed by means of adjustment nuts 65b, which may be adjusted to change the distance between the cap flange 64 and the adjusting ring. A tubular piston rod 66 carrying a piston 67 is preferably threadedly attached to the bottom manifold 58 and slidably projects through the cap 63. The bottom manifold 58 has a fluid passage 58a which communicates with the piston rod passage 73. A manifold inlet fitting 148 is threadedly attached to the manifold air passage 58a in air tight relation. A pair of bars 68 rigidly project from the slidable cap 63 and are pivotally connected to the door post 69 of a sliding door 70 by a bracket 71 or other similar means. The door 70 may be supported in slidable relation on a track 72 by means of rollers (not shown) attached to hangers 70a. The door 70 may be supported in slidable relation by any other suitable means, as desired.

Figure 7:
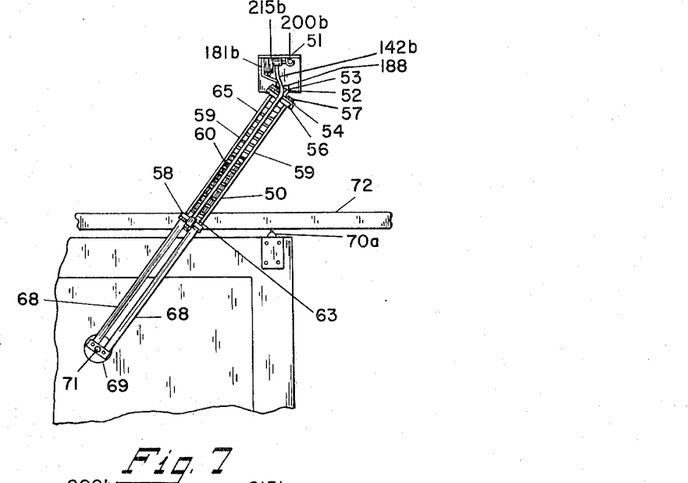
FIG. 7 is a front view of a second embodiment of an automatic door operator in its position when the door is closed.

FIGS. 7 to 11 illustrate the operation of the over-center operator 50 in opening the door 70. In FIG. 7 the door 70 is closed and at rest. A fluid under pressure, preferably air, enters the cylinder 60 through the inlet fitting 148, manifold fluid passage 58a and piston rod passage 73, pushing the slidable cylinder 60 and its attached cap 63 upwardly. The bars 68 secured to the cap 63 are pulled upwardly, thereby causing the door 70 attached to door post 69 to slide horizontally along the track 72 toward an open position. When the door reaches approximately the halfway point in its travel, as shown in FIG. 8, the pressurized fluid is exhausted from the cylinder 60 to eliminate the force on the piston 67 and the piston rod 66. The momentum of the door 70 and the tension given the spring 65 by the movement of the over-center operator 50 to the position of FIG. 8 then complete the opening of the door. In FIG. 9 the door 70 is open and at rest. Other than being inclined in different directions, the elements of the over-center operator 50 occupy the same positions relative to each other in both FIGS. 7 and 9. The operation of the over-center operator 50 in closing the door 70 is identical to that in opening it, except that the door 70 moves in the opposite direction.

Figure 12:
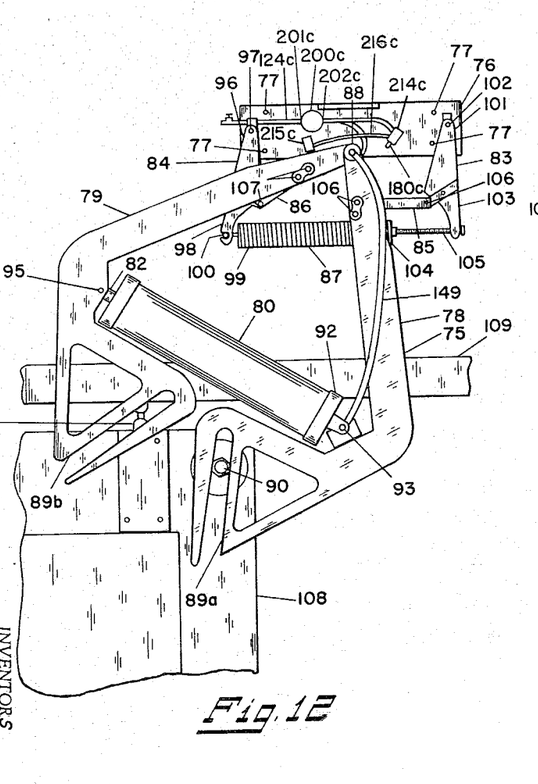
FIG. 12 is a front view of a third embodiment of an automatic door operator in its position when the door is closed.
Figure 13:
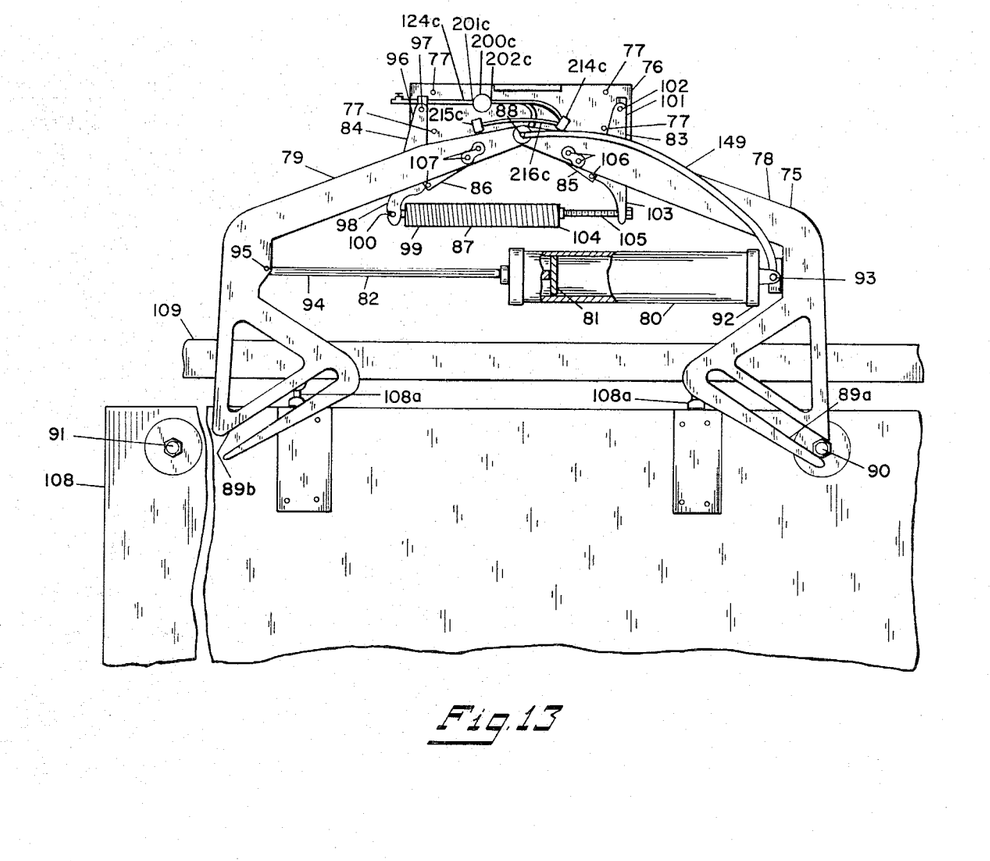
FIG. 13 is a front view, partially in vertical section, of the door operator of FIG. 12 during its operation.
Figure 14:
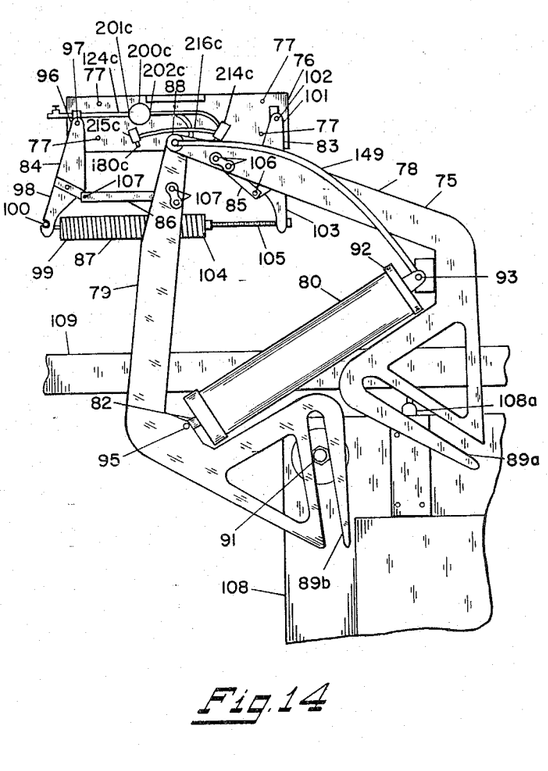
FIG. 14 is a front view of the door operator of FIG. 12 when the door is open.

Like the over-center operator 50, the inertia operator 75 shown in FIGS. 12 to 14 may be adapted to open any sliding door. The working elements of the inertia operator 75 are supported by a frame 76 which may be secured to a wall by bolts 77 or other similar means. Those working elements include a right main lever 78, a left main lever 79, a cylinder 80 encasing a piston 81 and a piston rod 82, a right and a left arm 83 and 84, a right and a left link 85 and 86, and a spring 87. The right main lever 78 and the left main lever 79 are each pivotally secured to the frame 76 by the same pin 88 or other similar means, and each main lever has a slot 89. The slot 89a in the right main lever 78 is adapted to engage a right door post 90; the slot 89b in the left main lever 79 a left door post 91.

The right end 92 of the cylinder 80 is pivotally connected to the right main lever 78 by a pin 93 or other similar means. The left end 94 of the piston rod 82 is pivotally connected to the left main lever 79 by a pin 95 or other similar means. The upper end 96 of the left arm 84 is pivotally secured to the frame 76 by a pin 97 or other similar means, while its lower end 98 is pivotally secured to the left end 99 of the spring 87 by a pin 100 or other similar means. The upper end 101 of the right arm 83 is pivotally attached to the frame 76 by a pin 102 or other similar means, and its lower end 103 is attached to the right end 104 of the spring 87 by a screw 105 or other similar means which will allow the tension in the spring 87 to be adjusted. The right link 85 is pivotally connected to both the right arm 83 and the right main lever 78 by pins 106 or other similar means; the left link lever 86 is pivotally connected to both the left arm 84 and the left main lever 79 by pins 107 or other similar means. A sliding door 108, from which the right and left door posts 90 and 91 project, may be supported in slidable relation on a track 109 by means of rollers (not shown) attached to hangers 108a, or by any other suitable means.

The operation of the inertia operator 75 in opening the door 108 is illustrated in FIGS. 12 to 14. In FIG. 12 the door 108 is closed and at rest, and right door post 90 is engaged by the slot 89a in the right main lever 78. A fluid under pressure, preferably air, enters the cylinder 80 at its right end 92 and begins to push the cylinder 80 to the right, causing the right main lever 78 to begin a counterclockwise rotation about pin 88 and to exert a lateral force toward the right on the right door post 90. The door 108 is thus caused to slide horizontally along the track 109 toward an open position. When the right main lever 78 has rotated to the position shown in FIG. 13, the pressurized fluid is exhausted from the cylinder to eliminate the force on the piston 81 and piston rod 82. The momentum of the moving door 108 causes the door to continue sliding toward the open position, thereby causing right door post 90 to leave the right main lever slot 89a. The right and left main levers 78 and 79 are maintained in the position shown in FIG. 13 by the extension spring 87 and the connected right and left arms 83 and 84 and links 85 and 86 until the left door post 91 of the moving door 108 engages the left main lever slot 89b. The momentum of the moving door 108 causes the left main lever 79 to be rotated counterclockwise on pin 88 by left door post 91 to the position shown in FIG. 14, wherein the door 108 is open and at rest. The operation of the inertia operator 75 in closing the door 108 is similar to that in opening it, except that the left main lever 79 begins the closing motion of the door, whereas the right main lever 78 begins the opening motion in the embodiment shown.

From the above description, it is obvious that a pneumatic control system for automatic door operators of the types described must:

(1) Initiate a flow of fluid under pressure to the cylinder and piston to begin the opening or closing of the door;

(2) Exhaust the pressurized fluid from the cylinder before the door has reached the end of its travel; and (3) As a preferred additional requirement, dampen the operation of the spring or door momentum to prevent slamming of the door.

Our novel pneumatic control system quickly and surely performs these requirements.

Figure 6A:
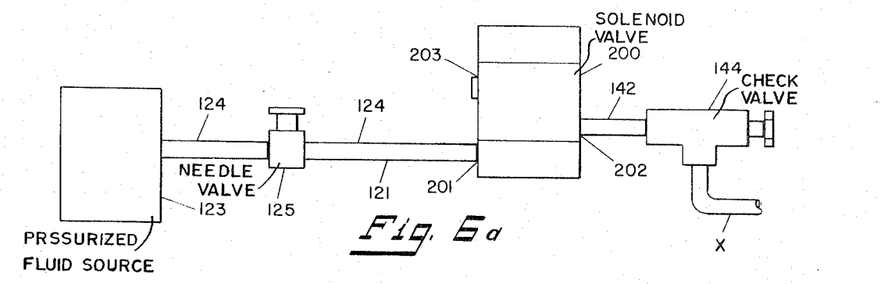
FIG. 6a is a schematic diagram of our electrically operated pneumatic control system for automatic door operators.
Figure 6B:
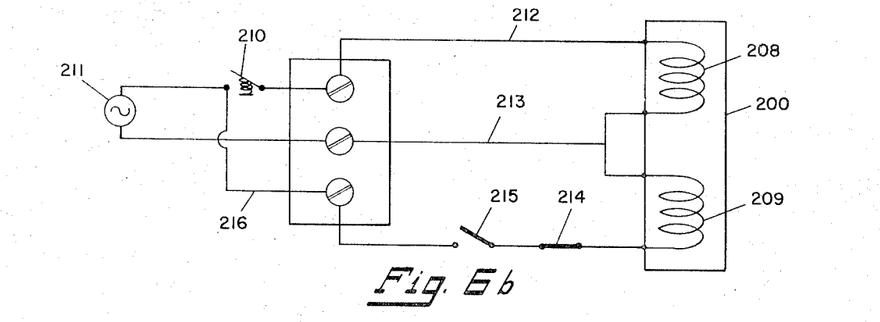
Figure 15:
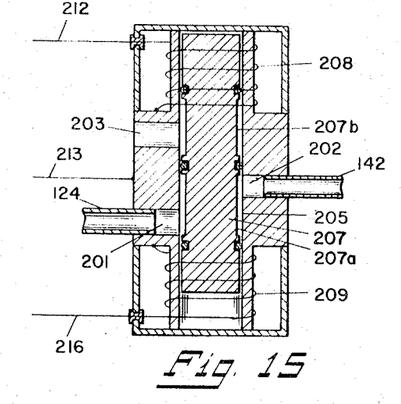
FIGS. 15 and 16 are vertical section views of a valve which may be used in the electrically operated control system of FIGS. 6a and 6b, showing first and second positions of the valve.
Figure 16:
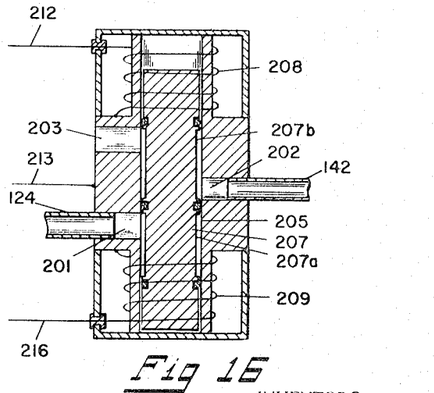

FIGS. 6a, 6b, 15 and 16 schematically illustrate our electrically operated pneumatic control system. The pneumatic circuit 121 of FIG. 6a has a source 123 of fluid under pressure, a main fluid line 124, a needle valve 125, an outlet line 142, a check valve 144 and a line x extending from the check valve. In addition, it has a solenoid operated control valve 200 which controls the flow of fluid under pressure to and from the automatic door operators with which it is used. Control valve 200, which is schematically shown in FIGS. 15 and 16 has an inlet 201 in communication with main fluid line 124; an outlet 202 in communication with outlet line 142; an exhaust 203 to the atmosphere; a cylindrical fluid passage 205 in communication with the inlet 201, the outlet 202 and the exhaust 203; and a valve member 207 having annular ports 207a and 207b. The valve member 207 has a first position, shown in FIG. 15, in which annular port 207a permits communication between the inlet 201 and the outlet 202, and a second position, shown in FIG. 16, in which annular port 207b permits communication between the outlet 202 and the exhaust 203. As schematically shown in FIGS. 6b, 15 and 16, the solenoid operated valve 200 additionally has a first coil 208 and a second coil 209. The control valve 200 which is illustrated in FIGS. 15 and 16 and described herein is only one example of a suitable electrically operated control valve. Any other such valve having an inlet, an outlet, an exhaust, and electrically operated valve means for selectively controlling the flow of fluid from the inlet to the outlet, and from the outlet to the exhaust, would be equally suitable.

The valve member 207 is actuated and placed in its first position as illustrated in FIG. 15 when normally open energizing switch 210, shown in FIG. 6b, is momentarily closed to complete a circuit from power source 211 through switch 210, line 212 first coil 208 and line 213. The power source 211 may be any available electrical power source. The second coil 209 is actuated to place valve member 207 in its second position as illustrated in FIG. 16 when normally open de-energizing switches 214 and 215 are both closed to complete a circuit from the power source 211 through line 216, switches 215 and 214, second coil 209 and line 213.

Our electrically operated pneumatic control system may now be described in operation with each of the three types of automatic operators described above. In the pneumatic circuit 121 of FIG. 6a, a line x extends from the check valve 144. The line x schematically represents hose 145 (shown in FIGS. 1–3) when the pneumatic circuit 121 is employed with the swing operator 20; line x represents the manifold inlet fitting 148 and manifold air passage 58a (shown in FIG. 11) when the pneumatic circuit 121 is employed with the over-center operator 50; and line x represents the line 149 extending to the cylinder 80 of the inertia operator 75 when the pneumatic circuit is used with the inertia operator shown in FIGS. 12–14.

As previously mentioned, one of the functional requirements of the pneumatic control system is exhausting the pressurized fluid from the cylinder when the door has reached the approximate midpoint of its travel. In a manner to be described in detail later, the closing of the de-energizing switches 214 and 215 in the electrical circuit of FIG. 6b intiates the performance of that function when our pneumatic control system is used with the inertial operator 75. When the pneumatic control system is used with the swing operator 20, or the over-center operator 50, only one de-energizing switch is needed, and therefore it will be assumed that line 216 contains de-energizing switch 215, only. Means are provided the swing operator 20, the over-center operator 50, and the inertial operator 75 to close the de-energizing switches at the appropriate time.

Figure 4:
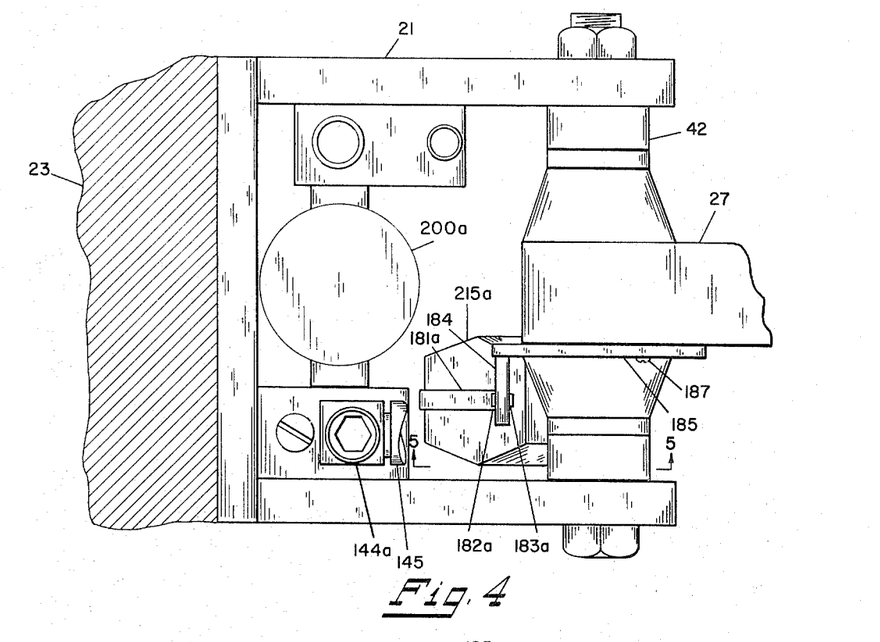
FIG. 4 is a partial end view of the door operator of FIG. 1 taken along section line 4—4.
Figure 5:
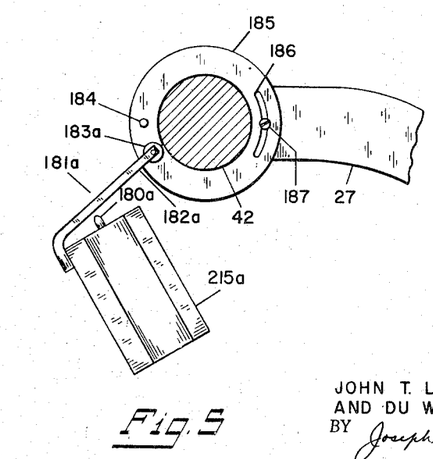
FIG. 5 is a partial section view taken along line 5—5 in FIG. 4 and showing only a bleed valve and its operator.

A preferred means for closing the de-energizing switch 215 of the electrical circuit of FIG. 6b when used with the swing operator 20 is shown in FIGS. 4 and 5. Those elements of FIGS. 6a and 6b which are shown in FIGS. 1–5 are further designed by the letter "a" to avoid confusion. The de-energizing switch 215a which is secured to the frame 21 by any suitable means, has a plunger 180a and an actuator 181a adapted to engage and push down the plunger 180a to close the switch. As shown in FIG. 5, the actuator 181a may be pivotally attached to the body of the de-energizing switch 215a in spaced relation to the plunger 180a and carries its free end 182a a small follower wheel 183a. A timing pin 184 projects from a disc 185 which is adjustably secured to the main lever 27. The disc 185 rotates with the main lever 27 about the shaft 42. The timing pin 184 is adapted to strike the follower wheel 183a and push down the actuator 181a to thereby momentarily close the de-energizing switch 215a. The disc 185 is adjustable to vary the circumferential position of the pin 184 with respect to the position of the main lever 27. One preferred means for adjusting the position of the disc 185 on the main lever 27 is shown in FIG. 5. The disc 185 is maintained in the desired position with respect to the main lever 27 by a screw 187 or other threaded means which engages the main lever 27 through a slot 186 in the disc 185. The position of the main lever 27 at the time the pin 184 closes the de-energizing switch 215a depends upon the position of the disc 185 on the main lever 27. Preferably, the plate 185 is adjusted so that the pin 184 will close the de-energizing switch 215a when the door being operated reaches approximately the half-way point in its travel.

FIG. 10 illustrates a preferred means for opening the de-energizing switch 215 of the electrical circuit of FIG. 6b when used with the over-center operator 50. These elements of FIGS. 6a and 6b which are shown in FIGS. 7–11 are further designated by the letter "b" to avoid confusion. The de-energizing switch 215b is shown in a closed position in FIG. 10, with its plunger 180b depressed by the actuator 181b. The actuator 181b is moved to depress the plunger 180b by the cam 188 projecting upwardly from the bearing 52, which rotates about the shaft 53. The cam 188 is preferably positioned to momentarily close the de-energizing switch 215b at approximately the halfway point in the travel of the door being operated. If desired, the position of the de-energizing switch 215b may be made adjustable to vary the time at which it is opened.

When used for controlling the inertia operator 75, the de-energizing switches of the electrical circuit of FIG. 6b are closed directly by the left main lever 79 and the right main lever 78, respectively, as shown in FIGS. 12–14. Those elements of FIGS. 6a and 6b which are shown in FIGS. 12–14 are further designated by the letter "c" to avoid confusion. Normally open, the de-energizing switches 214c and 215c for the inertia operator 75 are closed when their plungers 180c are depressed by the main levers 78 and 79. In FIG. 12, where the door 108 is closed, the de-energizing switch 215c is closed, while the de-energizing switch 214c is open. In FIG. 14, where the door 108 is open, the de-energizing switch 215c is open, while the de-energizing switch 214c is closed. But in FIG. 13, where the main levers 78 and 79 are pushed farthest apart by the cylinder 80 and piston 81, both de-energizing switches 214c and 215c are closed.

The operation of our pneumatic control system may now be described in detail. For the purpose of convenience it will be assumed that the pressurized fluid used in the circuit is compressed air.

When the door 48 operated by the swing operator 20 is closed and at rest as shown in FIG. 1, the energizing switch 210 and the de-energizing switch 215a are open; the valve 207 of solenoid operated control valve 200 is in its second position, shown in FIG. 16; the valve outlet 202 is in communication with the valve exhaust 203 through annular port 207b; and cylinder 24 is exhausted. When energizing switch 210 is momentarily closed a current is established through the first coil 208. The valve 207 is moved to its first position shown in FIG. 15, to allow compressed air to pass from the main fluid line 124 through the valve inlet 201, the annular port 207a and valve outlet 202 to the cylinder 24 and piston 26, thus initiating the opening of the door 48. Switch 210 is preferably operated manually, and allowed to open immediately. The control valve 200 is adapted to remain in said first position until a current is established through the second coil 209. When the swing operator reaches the position shown in FIG. 2 wherein the door 48 has completed approximately one-half of its travel, de-energizing switch 215a is momentarily closed as previously explained above. A current is thereby established through the second coil 209, and the valve 207 is then moved to its second position, shown in FIG. 16, allowing the air in the cylinder 24 to exhaust through the check valve 144, the valve outlet 202, the annular port 207b, and the exhaust 203. The momentum of the door 48 and the action of the spring 30 (dampened by the action of the check valve 144 which is of conventional known construction to permit unrestricted flow of air from the control valve 200 to the cylinder 24, and to restrict the flow of air from the cylinder to the control valve exhaust 203) complete the opening of the door 48 to the position shown in FIG. 3. The control valve 200 is adapted to remain in said second position until a current is again established through the first coil 208. The above-described operation of our electrically operated pneumatic control circuit 121 is repeated to close the door 48.

Operation of the control system of FIGS. 6a, 6b, 15 and 16 is identical when the system is employed to control the over-center operator 50 of FIGS. 7 to 11, with the exception that the deenergizing switch 215b is adapted to be momentarily closed by the cam 188 of the over-center operator in the manner described above.

Operation of the control system of FIGS. 6a, 6b, 15 and 16 is identical when the system is employed to control the inertia operator 75 of FIGS. 12 to 14 with the exceptions that both de-energizing switches are employed in the manner shown in FIG. 6b. The de-energizing switches 214c and 215c are each adapted to be closed by right and left main lever arms 78 and 79, respectively, in the manner described above.

It is, of course, obvious that it is understood that our invention is not confined to the particular construction and arrangement of parts herein illustrated and described, but embraces all such modified forms thereof as come within the scope of the following claims.

We claim:
1. A control system for an automatic door operator having two positions corresponding to open and closed positions, respectively, for an associated door operated thereby, said control system comprising:
(a) a fluid-operated piston located in reciprocable relation within a cylinder,
(b) said piston and said cylinder being connected to said door operator such that when pressurized fluid is supplied to said cylinder said piston and said cylinder will initiate movement of said door operator from one of its said positions to the other said position,
(c) spring means having an inner end and an outer end, the inner end of said spring means and one end of said cylinder being connected to a frame, the outer end of said spring means and said piston being connected to a lever pivotally connected to said frame, said lever being pivotally connected to said door for operating same, said spring means providing force for exhausting said pressurized fluid from said cylinder when said door operator reaches the approximate midpoint of its travel from said one of its said positions to the other of said positions and for causing said operator to complete its movement to said other position,
(d) a source of fluid under pressure,
(e) a control valve having an inlet in communication with said fluid source, an outlet in communication with said cylinder and said piston and an exhaust in communication with the atmosphere,
(f) valve means located within said control valve,
(g) said valve means having a first position wherein said valve means permits the passage of fluid from said fluid source to said cylinder and piston and prevents the passage of fluid to said exhaust, and having a second position wherein said valve means prevents the passage of fluid from said fluid source to said cylinder and piston and permits the flow of fluid from said cylinder to said exhaust,
(h) actuating means associated with said control valve to cause movement of said valve means back and forth between said first and second positions,
(i) said actuating means comprising a two stage solenoid having a first coil which causes said valve means to move to said first position when an electric current is passed therethrough, and having a second coil which causes said valve means to move to said second position when an electric current is passed therethrough,
(j) a normally open energizing switch in series with said first coil which when closed will permit an electric current to pass through said first coil,
(k) at least one normally open de-energizing switch in series with said second coil which when closed will permit an electric current to pass through said second coil, and
(l) means associated with said door operator for closing said de-energizing switch when said door operator reaches the approximate midpoint of its travel from one of its said positions to the other of said positions.

2. A control system for an automatic door operator having two positions corresponding to open and closed positions, respectively, for an associated door operated thereby, said control system comprising:
(a) a fluid-operated piston located in reciprocable relation within a cylinder,
(b) said piston and said cylinder being connected to said door operator such that when pressurized fluid is supplied to said cylinder said piston and said cylinder will initiate movement of said door operator from one of its said positions to the other said position,
(c) spring means having one end thereof pivotally connected to a frame, the other end of said spring engaging said cylinder which is fixedly secured to an operating bar connected to the door to be operated, said spring means providing force for exhausting said pressurized fluid from said cylinder when said door operator reaches the approximate midpoint of its travel from said one of its said positions to the other of said positions and causing said operator to complete its movement to said other position,
(d) a source of fluid under pressure,
(e) a control valve having an inlet in communication with said fluid source, an outlet in communication with said cylinder and said piston, and an exhaust in communication with the atmosphere.
(f) valve means located within said control valve,
(g) said valve means having a first position wherein said valve means permits the passage of fluid from said fluid source to said cylinder and piston and prevents the passage of fluid to said exhaust, and having a second position wherein said valve means prevents the passage of fluid from said fluid source to said cylinder and piston and permits the flow of fluid from said cylinder to said exhaust,
(h) actuating means associated with said control valve to cause movement of said valve means back and forth between said first and second positions,
(i) said actuating means comprising a two stage solenoid having a first coil which causes said valve means to move to said first position when an electric current is passed therethrough, and having a second coil which causes said valve means to move to said second position when an electric current is passed therethrough,
(j) a normally open energizing switch in series with said first coil which when closed will permit an electric current to pass through said first coil,
(k) at least one normally open de-energizing switch in series with said second coil which when closed will permit an electric current to pass through said second coil, and
(l) means associated with said door operator for closing said de-energizing switch when said door operator reaches the approximate midpoint of its travel from one of its said positions to the other of said positions.

3. A control system for an automaic door operator having two positions corresponding to open and closed positions, respectively, for an associated door operated thereby, said control system comprising:

(a) a fluid-operated piston located in reciprocable relation within a cylinder,
(b) said piston and said cylinder being connected to said door operator such that when pressurized fluid is supplied to said cylinder said piston and said cylinder will initiate movement of said door operator from one of its said positions to the other said position,
(c) spring means connected between a pair of arms which are pivotally connected to a frame and to a pair of main levers, said piston and cylinder being connected between said main levers, said main levers being adapted to operate said door, said spring means providing force for exhausting said pressurized fluid from said cylinder when said door operator reaches the approximate midpoint of its travel from said one of its positions to the other of said positions and for causing said operator to complete its movement to said other position,
(d) a source of fluid under pressure,
(e) a control valve having an inlet in communication with said first source, an outlet in communication with said cylinder and said piston, and an exhaust in communication with the atmosphere,
(f) valve means located within said control valve,
(g) said valve means having a first position wherein said valve means permits the passage of fluid from said fluid source to said cylinder and piston and prevents the passage of fluid to said exhaust, and having a second position wherein said valve means prevents the passage of fluid from said fluid source to said cylinder and piston and permits the flow of fluid from said cylinder to said exhaust,
(h) actuating means associated with said control valve to cause movement of said valve means back and forth between said first and second positions,
(i) said actuating means comprising a two stage solenoid having a first coil which causes said valve means to move to said first position when an electric current is passed therethrough, and having a second coil which causes the valve means to move to said second position when an electric current is passed therethrough,
(j) a normally open energizing switch in series with a first coil which when closed will permit an electric current to pass through said first coil,
(k) at least one normally open de-energizing switch in series with said second coil which when closed will permit an electric current to pass through said second coil, and
(l) means associated with said door operator for closing said de-energizing switch when said door operator reaches the approximate midpoint of its travel from one of its said positions to the other of said positions.

4. The invention described in claim 3 wherein the electric circuit comprising said de-energizing means has a second normally open switch connected in series with said first switch such that both said first and second switches must be closed to permit an electric current to pass through said solenoid second coil.

References Cited by the Examiner
UNITED STATES PATENTS

| | | | |
|---|---|---|---|
| 2,289,385 | 7/1942 | Rippl | 91—459 X |
| 2,546,904 | 3/1951 | Nelius | 91—216 X |
| 2,676,572 | 4/1954 | Perry | 91—361 X |
| 2,820,343 | 1/1958 | Berthiez | 91—459 X |
| 3,149,536 | 9/1964 | Hewitt | 91—407 |
| 3,196,599 | 7/1965 | Meiners | 91—31 X |

MARTIN P. SCHWADRON, *Primary Examiner.*

P. T. COBRIN, *Assistant Examiner.*

UNITED STATES PATENT OFFICE
CERTIFICATE OF CORRECTION

Patent No. 3,291,003                          December 13, 1966

John T. Lunenschloss et al.

It is hereby certified that error appears in the above numbered patent requiring correction and that the said Letters Patent should read as corrected below.

Column 6, line 3, after "carries" insert -- at --; line 26 for "These" read -- Those --; column 9, line 36, for "first" read -- fluid --.

Signed and sealed this 19th day of September 1967.

(SEAL)
Attest:

ERNEST W. SWIDER                        EDWARD J. BRENNE
Attesting Officer                            Commissioner of Patents